W. G. KIRCHHOFF.
CHANGE SPEED MECHANISM.
APPLICATION FILED JUNE 24, 1915.

1,189,136.

Patented June 27, 1916.
3 SHEETS—SHEET 1.

Witnesses
G. Garland Brown.
W. Thornton Rogers

Inventor
William G. Kirchhoff
By Walter F. Murray
Attorney

W. G. KIRCHHOFF.
CHANGE SPEED MECHANISM.
APPLICATION FILED JUNE 24, 1915.

1,189,136.

Patented June 27, 1916.
3 SHEETS—SHEET 2.

Witnesses
G. Garland Brown
W. Thornton Bogert

Inventor
William G. Kirchhoff
By Walter G. Murray
Attorney

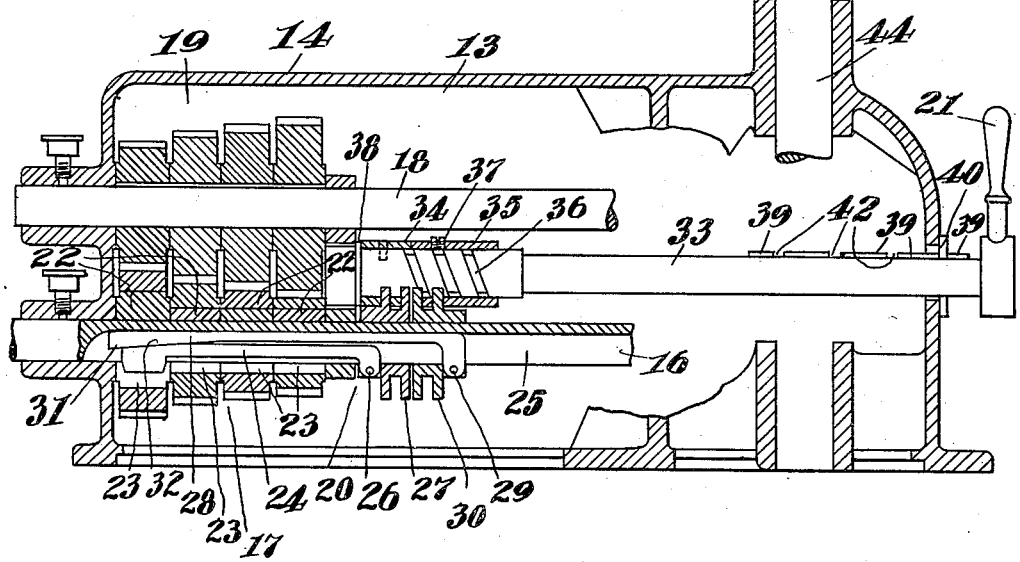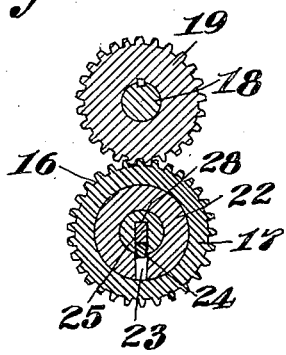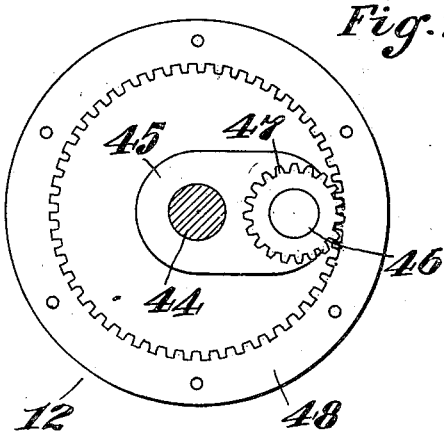

UNITED STATES PATENT OFFICE.

WILLIAM G. KIRCHHOFF, OF CINCINNATI, OHIO, ASSIGNOR TO THE LYNN SUPERIOR COMPANY, OF CINCINNATI, OHIO, A CORPORATION OF OHIO.

CHANGE-SPEED MECHANISM.

1,189,136.   Specification of Letters Patent.   Patented June 27, 1916.

Application filed June 24, 1915. Serial No. 36,028.

*To all whom it may concern:*

Be it known that I, WILLIAM G. KIRCHHOFF, a citizen of the United States of America, and resident of Cincinnati, county of Hamilton, State of Ohio, have invented certain new and useful Improvements in Change-Speed Mechanisms, of which the following is a specification.

This invention relates to change speed mechanisms for mixing machines of the kind having a rotary paddle, means for varying the speed of rotation of the paddle, a bowl and means for moving the bowl toward and from the paddle.

Figure 1:
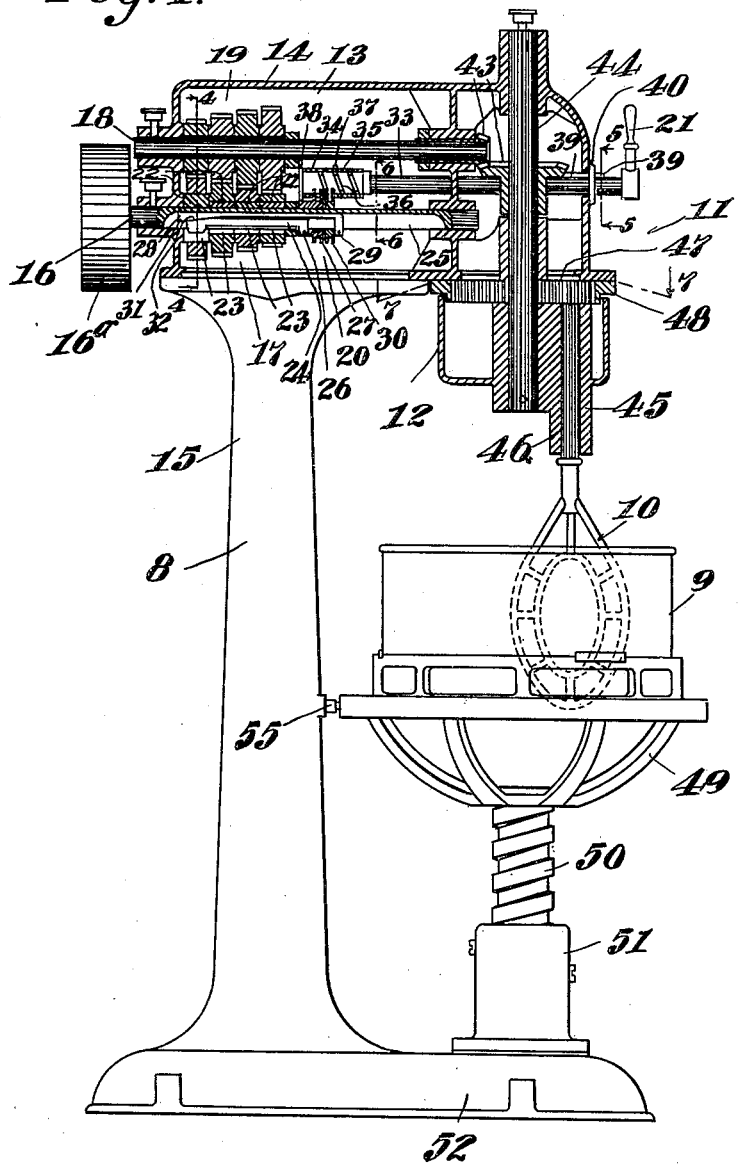
Figure 2:
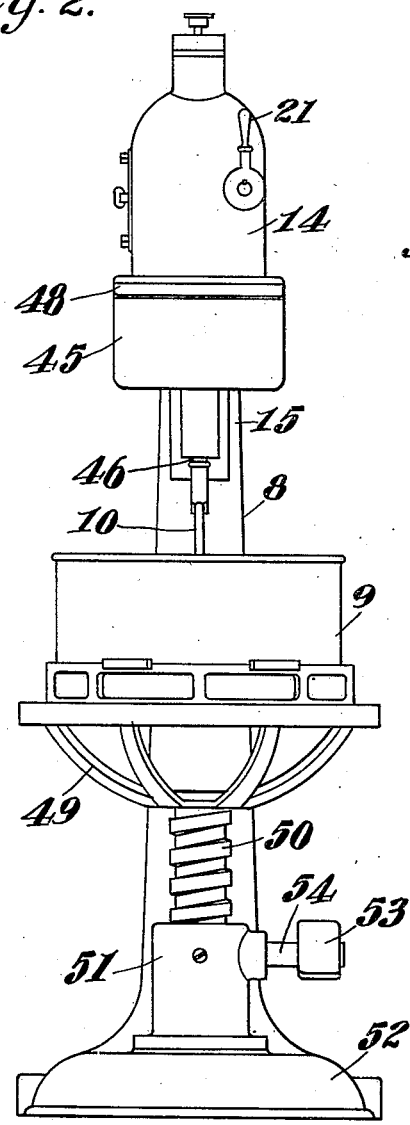
Figure 5:
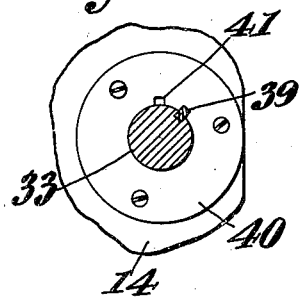
Figure 6:
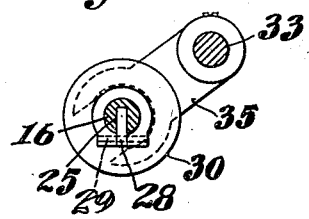

An object of my invention is to increase the number of speed changes and to simplify the operations of making them. This and other objects are attained in the change speed mechanisms for mixing machines described in the following specification and illustrated in the accompanying drawings in which;

Figure 1 is a side elevation of a mixing machine embodying my invention, with certain parts shown in section. Fig. 2 is a front elevation of the mixing machine illustrated in Fig. 1. Fig. 3 is an enlarged sectional view of the paddle change-speed mechanism illustrated in section in Fig. 1, with certain parts removed and broken away for clearness of illustration. Fig. 4 is a sectional view taken on the line 4—4 of Fig. 1. Fig. 5 is a sectional view taken on the line 5—5 of Fig. 1. Fig. 6 is a sectional view taken on the line 6—6 of Fig. 1. Fig. 7 is a horizontal sectional view taken on the line 7—7 of Fig. 1.

The mixing machine illustrated as an embodiment of my invention consists of a frame 8 having a mixing bowl 9 mounted thereon, a mixing paddle 10 located in the bowl, and a mechanism 11 adapted to secure rotation of the paddle. The mechanism 11 for operating the paddle will be considered as being divided into two portions, one portion 12 being adapted to rotate the paddle as well as to move the paddle about the interior surface of the bowl during the rotation. The other portion 13 of the mechanism is mounted in a casing 14 located on the pedestal 15 of the frame of the machine, and comprises the change speed mechanism for varying the speed of rotation of the paddle. This change speed mechanism consists of a driving shaft 16 having a series of gears 17 loosely mounted thereon and a driven shaft 18 having a series of gears 19 adapted to mesh with the gears 17, and secured to the driven shaft. The shaft 18 is adapted to be driven by the driving shaft 16 from any one of the gears 17 when these gears are secured to the driving shaft. Means 20 is provided for securing any one of the loosely mounted gears 17 to the driving shaft, and is suitably operated by means of a handle 21 located conveniently at the front of the casing 14 within reach of the operator of the machine. The means provided for securing any one of the gears 17 to the driving shaft 16 is as follows: On the shaft 16 is located a series of expanding collars 22, each of the collars being preferably secured to rotate with the shaft, but being provided with a slot 23 adapted to render them expansible so that they may be expanded upon the inner surface of the gears 17 rotatively mounted thereon. By expanding any one of the collars 22 any desired one of the gears 17 will be frictionally connected with the shaft 16 to drive the gears 19 and consequently the driven shaft 18, and for the purpose of expanding the collars a slot engaging key 24 which is mounted in an elongated slot 25 formed in the driving shaft 16 and pivotally mounted on a pin 26 secured to an extension of a grooved collar 27, has been provided, the collar 27 being slidably mounted upon the shaft 16. By moving the collar 27 along the shaft, the key 24 will be brought to occupy the slot 23 of the collar of the gear to be connected to the shaft 16. Normally however, the key 24 will merely occupy the slot 23 without causing expansion of the collar, and for this reason additional means consisting of a locking key 28 has been provided for the purpose of forcing the key 24 into the slot. This key 28 is pivotally mounted on a pin 29 secured to an extension of a grooved collar 30 which is also slidably mounted on the driving shaft 16 adjacent to the collar 27. By means of this mechanism it will be seen that when the collar 27 is moved to bring the key 24 into the desired one of the slots 23, the collar 30 will also be moved at the same time so that the key 28 will be moved with the key 24. When the key 24 has been located properly the collar 30 is moved away from the collar 27 to bring the inclined surface 31 of the key 28 into engagement with the inclined surface 32 of the key 24. This forces the key 24 into the slot to expand the collar within the gear loosely mounted thereon, to secure the gear to the driving shaft.

For the purpose of moving the collars 27 and 30 I have provided a mechanism which consists of a shaft 33 extending from the front to the back of the casing 14, with two forks 34 and 35 adapted to engage the grooves in the respective collars for the purpose of giving them movement relatively to one another to cause the key 28 to force the key 24 into collar expanding engagement with the slots 23. The shaft 33 is slidably as well as rotatively mounted in its bearings in the casing 14 and is provided with a screw thread 36 adapted to be engaged by a pin 37 located in the fork 35 for the purpose of moving the fork and consequently the collar 30 away from the collar 27 when the shaft 23 is rotated. The shaft is also provided with an abutment flange 38 against which the fork 34 abuts for the purpose of moving the fork with the shaft 33 when it is moved in and out to locate the key 24. Of course, the fork 35 will also move with the fork 34 during the forward and backward movement of the shaft 33, but because of its connection with the screw thread 36 by means of its pin 37, it will be moved away from the fork 34 upon slight rotation of the shaft 33 by means of its operating handle 21. When therefore, the key 24 is to be located in the desired one of the slots 23 the shaft 33 is moved by the handle 21 to the proper position to bring the key into register with the slot. With the shaft so located, it is rotated by moving the handle 21 downwardly thus causing pin 37 of the fork 35 to travel in the screw thread 36. This causes the collar 30 to be moved away from the collar 27, to draw the key 28 into such a position that the inclined surface 31 of its head will be brought into engagement with the inclined surface 32 of the head of the key 24 so that the key will be forced into the slot 23 to expand the collar 22 and to secure the gear mounted thereon in driving connection with the shaft 16. For the purpose of aiding the operator to properly locate the key 24 a series of keys 39 are mounted on the upper side of the shaft 33 and are spaced apart a distance equal to the thickness of a plate 40 secured to the front of the casing, and through which the shaft 33 is adapted to move. This plate 40 is in the nature of an escutcheon in that it is provided with a notch 41 through which the keys 39 are adapted to be passed and with which the spaces 42 between the keys, are adapted to register. When it is desired therefore, to bring the key 24 into a desired position, the keys 39 are moved through the notch 41 of the escutcheon plate 40 until the space 42 corresponding to the proper location of the key is brought to register with the notch 41. In this position the handle 21 is turned to rotate the shaft 33 and the keys 39 so that the keys on each side of the escutcheon will be moved away from the notch 41 thereby preventing longitudinal reciprocation of the shaft 33. This rotary motion of the shaft 33 causes the pin 37 to travel in the screw thread 36 to bring the key 28 into locking engagement with the key 24. By means of this mechanism one of the gears 17 may be selected without having to connect each consecutive gear with the shaft 16 before the desired gear is reached.

In use, the bowl 9 is moved to its lowest position and the batch is placed therein. The power is then turned on and the change speed mechanism adjusted to drive from the smallest one of the gears 17 for the purpose of giving the mixing paddle its lowest speed of rotation. The bowl is then moved gradually upward until it occupies a position in which the paddle is brought gradually into the batch. As the bowl is raised to bring the paddle nearer the bottom of the batch, the speed thereof is changed by moving the handle 21 to bring the key 24 to lock the next largest of the gears 17 to the drive shaft 16 for the purpose of bringing the next highest gear ratio into operation. This operation of gradually increasing the speed of the paddle 10 is carried on as the bowl 9 is gradually raised to bring the batch higher and higher, until the paddle is fully submerged therein. At this point the highest speed of rotation is brought into action by moving the key 24 into engagement with the slot 23 of the collar 22 of the largest of the gears 17 for the purpose of driving the driven shaft 18 at its highest rate of rotation. The reason for increasing the speed of rotation of the paddle as it is brought farther into the batch, is to prevent the batch from being whipped too violently near its surface and consequently throwing the batch outside of the bowl. Of course, it will be understood that the batches to be mixed will vary materially in constituency since at times it may be necessary to mix a heavy dough such as may be used in making bread, while at other times it may be necessary to mix a batch of somewhat lighter constituency such as may be used in making cakes, and that under such circumstances it may be necessary to run the machine at a much slower speed in mixing bread dough than it would in mixing cake dough. In addition to this the beating of eggs and such mixtures as butter and sugar will necessitate operating the paddle at much higher speeds than that at which it is operated in mixing dough. In changing from one speed to another and in raising and lowering the bowl it will be seen that the operation may be easily accomplished since the handle 21 for operating the keys 24 and 28 is within easy reach of the operator, and the rim of the bowl receiver 49 is also within easy reach of the operator so that the bowl may be rotated to raise and lower it for the purpose of bringing the paddle into or out of the batch.

Having thus described my invention, what I claim is:

1. In a change speed mechanism for mixing machines, the combination of a slotted driving shaft, a driven shaft, a series of gears of different diameters mounted on and secured to the driven shaft, a series of split collars mounted on and adapted to rotate with the driving shaft, a series of gears meshing with the gears of the first mentioned set and rotatively mounted on the collars, a collar expanding key reciprocally mounted in the slot of the driven shaft and adapted to expand the collars to lock the gears thereon, and means adapted to reciprocate the key, said means comprising a grooved collar mounted on the driving shaft and operatively connected with the key, a fork connected with the grooved collar, a slidingly and rotatively mounted shaft operatively connected with the fork and adapted to shift the collar expanding key when the shaft is shifted, a series of locating keys spaced apart on the slidingly mounted shaft, and an escutcheon plate located adjacent to the locating keys and adapted to permit the keys to pass the plate during the sliding movement of the shaft to shift the collar expanding key, and to lock the shaft against sliding movement when it is rotated to bring the locating keys in register with the plate.

2. In combination in a change speed mechanism for mixing machines, a slotted driving shaft, a driven shaft operatively connected with the paddle, a series of gears of different diameters mounted on and secured to the driven shaft, a series of split collars mounted on and adapted to rotate with the driving shaft, a series of gears meshing with the gears of the first mentioned set and rotatively mounted on the collars, a collar expanding key reciprocally mounted in the slot of the driving shaft and adapted to expand the collars to lock the gears thereon, means for moving the key to the collar to be expanded, a locking key for moving and locking the collar expanding key to its collar expanding position, and means for moving the locking key, said first and second mentioned means comprising a grooved collar reciprocally mounted on the driving shaft and operatively connected with the collar expanding key, a grooved collar reciprocally mounted on the driving shaft adjacent to the first mentioned grooved collar and operatively connected with the locking key, a slidingly and rotatively mounted shaft having screw threads formed thereon adjacent to the second mentioned grooved collar, a fork mounted on the screw threaded shaft adjacent to the screw threads and engaging the first mentioned grooved collar, a screw threaded fork mounted on the screw threads of the slidingly mounted shaft and engaging the second mentioned grooved collar, a series of locating keys spaced apart on the slidingly mounted shaft, and an escutcheon plate adapted to permit the locating keys to pass the plate during sliding movement of the shaft to shift the collar expanding key and to lock the shaft against sliding movement when it is rotated to bring the locating keys in register with the plate, said last mentioned movement being adapted to operate the screw threaded fork to move the locking key into engagement with the collar expanding key to move the collar expanding key into its collar expanding position.

In testimony whereof, I have hereunto subscribed my name this 22nd day of June, 1915.

WILLIAM G. KIRCHHOFF.

Witnesses:
WALTER F. MURRAY,
W. THORNTON BOGERT.